United States Patent
Marchant et al.

(10) Patent No.: US 6,442,126 B1
(45) Date of Patent: Aug. 27, 2002

(54) APPARATUS FOR RECORDING AND SIMULTANEOUSLY READING INFORMATION RECORDED ON A MOVEABLE OPTICAL RECORDING MEDIUM USING OBJECTIVE LENS AND BEAM SPLITTER

(75) Inventors: Alan B. Marchant, Fairport; Eugene G. Olczak, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/476,571

(22) Filed: Jan. 3, 2000

(51) Int. Cl.[7] ................................................ G11B 7/00
(52) U.S. Cl. ........................ 369/112.17; 369/53.22; 369/120
(58) Field of Search ......................... 369/53.2, 53.22, 369/95, 112.16, 112.17, 120

(56) References Cited

U.S. PATENT DOCUMENTS

| | | | |
|---|---|---|---|
| 5,105,403 A | * 4/1992 | Kando et al. | 369/44.12 |
| 5,191,204 A | * 3/1993 | Dickson et al. | 250/208.2 |
| 5,216,562 A | * 6/1993 | Luecke et al. | 360/114 |
| 6,141,312 A | * 10/2000 | Masters et al. | 369/97 |

OTHER PUBLICATIONS

"Optical Recording: A Technical Overview" by Alan B. Marchant, Addison–Wesley Publishing, 1990, p. 304.

* cited by examiner

Primary Examiner—William Korzuch
Assistant Examiner—Gautam R. Patel
(74) Attorney, Agent, or Firm—Raymond L. Owens

(57) ABSTRACT

Apparatus for simultaneously recording and reading information on a medium moveable in forward and reverse directions includes a first record laser and means for establishing a first beam path for recording information on the moveable medium and a second read laser and at least a first and second read-out detector respectively associated with the forward and reversed directions of the recording medium and means for establishing two beam paths which direct the laser light to positions forward and rearward from where the first laser beam illuminates the medium and such read laser beams are reflected respectively to the first and second detectors. The apparatus further includes means to select either the first or the second read-out detectors and to process information read by such selected detector so that as the medium is moving in the forward direction, the data are read from the first detector and when the medium is moving in the reverse direction. the data are read from the second detector.

4 Claims, 3 Drawing Sheets

APPARATUS FOR RECORDING AND SIMULTANEOUSLY READING INFORMATION RECORDED ON A MOVEABLE OPTICAL RECORDING MEDIUM USING OBJECTIVE LENS AND BEAM SPLITTER

FIELD OF THE INVENTION

The present invention relates to simultaneously reading and writing on an optical medium such as an optical tape.

BACKGROUND OF THE INVENTION

Direct Read After Write (DRAW) has been recognized as a design option for optical recording systems since the earliest introduction of the technology. (See Marchant, *Optical Recording: a Technical Overview*, Addison Wesley, 1990, p304.) As illustrated in FIG. 1, a prior art optical head 10 is schematically shown. A record laser 12 directs a beam of light establishing a beam path through an objective lens 14 which is focused on a recording spot 16 on a moveable optical medium 18 that is moving in direction 25 relative to the optical head. Also, a read laser 20 establishes and directs a beam of light through a beam splitter 22 and the objective lens 14 onto the surface of the moveable optical medium 18 to form a read spot 24. This beam of light is reflected back to the beam splitter 22 which directs the light beam to a detector 26 shown as a photodiode.

More particularly, the beam from the read laser 20 is unmodulated and is focused on the moveable medium 18 downstream from the recording spot. Reflection of the read laser beam from the medium is modulated by the presence of marks on the recording medium newly recorded by the record laser beam. The detector 26 reconstructs the recorded data for comparison with the data just processed for recording. This is why this process is called Direct Read After Write, or DRAW. DRAW provides nearly instantaneous verification of recorded data reliability, eliminating the latency encountered with conventional, second-pass verification.

In optical recording, there must be some level of verification that the recording medium will support error free recording and reproduction. When optical tape is the medium of choice, there is also a requirement that the recording system can record and read bi-directionally, that is, when the tape is either moving in a forward or reverse direction. A problem with optical tape recording systems is that existing DRAW heads do not have this functionality.

SUMMARY OF THE INVENTION

It is an object of the present invention to provide apparatus which provides DRAW functionality when the optical recording medium is moveable bi-directionally in either forward or reverse directions.

This object is achieved by an apparatus for simultaneously recording and reading information on a medium moveable in forward and reverse directions, comprising:

a) means including a first record laser and establishing a first beam path for recording information on the moveable medium;

b) means including at least a second read laser and at least a first and second read-out detector respectively associated with the forward and reversed directions of the recording medium, said means establishing two beam paths which direct the laser light to positions forward and rearward from where the first laser beam illuminates the medium and such read laser beams are reflected respectively to the first and second detectors; and c) means for selecting either the first or the second read-out detectors and for processing information read by such selected detector so that as the medium is moving in the forward direction, the data are read from the first detector and when the medium is moving in the second direction, the data are read from the second detector.

ADVANTAGES

The present invention has as an advantage that it permits the DRAW read beam to be focused at a position downstream from the recording beam, with respect to scanning of the medium during recording. In the prior art, if the media velocity is reversed, as in serpentine recording on optical tape, the DRAW beam is sometimes positioned on the upstream side of the recording beam, and therefore cannot detect the recorded pattern.

A feature of the present invention is that it provides verification without requiring prior art methods of pre-scanning for media defects or multiple-pass readout for data verification.

DETAILED DESCRIPTION OF THE INVENTION

Figure 1:
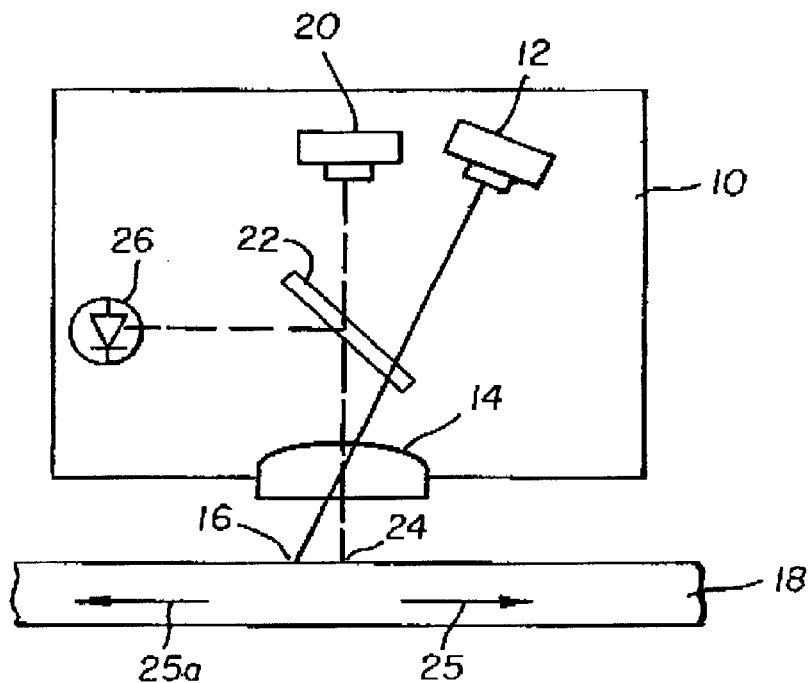
FIG. 1 a schematic illustration of a prior art DRAW arrangement for reading and writing on an optical medium which is moveable in one direction.

Turning now to FIG. 1 where an apparatus is shown having an optical head 10 that provides DRAW functionality that includes a record laser 12 that directs a beam of light through an objective lens 14 by which it is focused on a recording spot 16 on a moveable optical medium 18. The medium 18 can conveniently be a flexible optical tape. Alternatively, it could be an optical card. A read laser 20 directs a beam of light through a beam splitter 22 and the objective lens 14 onto the surface of the moveable optical medium 18 to form a read spot 24. This beam of light is reflected back to the beam splitter 22 which directs the light beam to a detector 26 shown as a photodiode.

Figure 2:
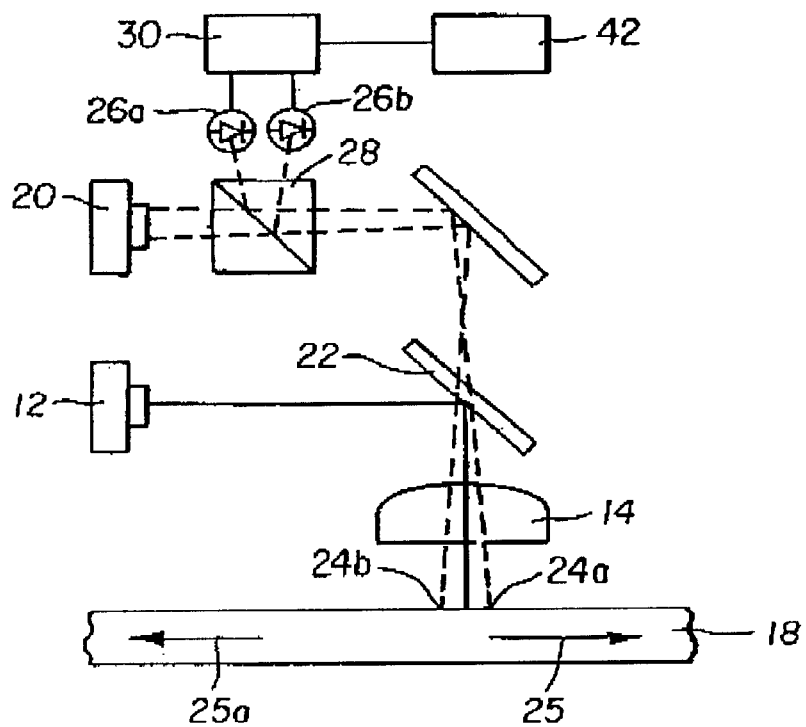
FIG. 2 is a schematic illustration of apparatus in accordance with a first embodiment of the present invention which uses DRAW and wherein the optical medium is moveable in forward and reverse directions.

FIG. 2 illustrates design of the optical head in accordance with the invention. The read laser device 20 includes at least two laser sources that create two read beams. Beam splitter 22 serves to combine the readout and recording beams for transmission through the objective lens 14. Another beam splitter 28 deflects the reflected portion of the readout beams to illuminate two readout detectors 26a and 26b shown as photodiodes. Read spot 24a is located directly downstream from the recording spot when the recording medium is moving in the direction indicated by arrow 25. While the medium is moving in this direction 25, a multiplexer circuit 30 directs the signal from detector 26a to the readout data channel 42. The multiplexer circuit 30 thereby selects detector 26a for processing information as the medium is moving in the forward direction. The medium can also be moved in the reverse direction 25a. Read spot 24b is located directly downstream from the recording spot when the recording medium is moving in that direction. When the medium switches to the reverse direction 25a, the multiplexer circuit 30 disconnects the data channel 42 from detector 26a and connects it to the signal from detector 26b. Thus for either forward or reverse media motion, the data channel receives a signal from a read spot that is located immediately downstream from the recording spot. The first and second detectors 26a and 26b are respectively associated with the forward and reverse directions of the recording medium, 25 and 25a. The two established readout beam paths are arranged to direct the laser light to read spots 24a and 24b, positioned forward and rearward from where the first laser beam illuminates the medium 18 for recording and the read laser beams are reflected respectively to the first and second detectors 26a and 26b.

Figure 3:
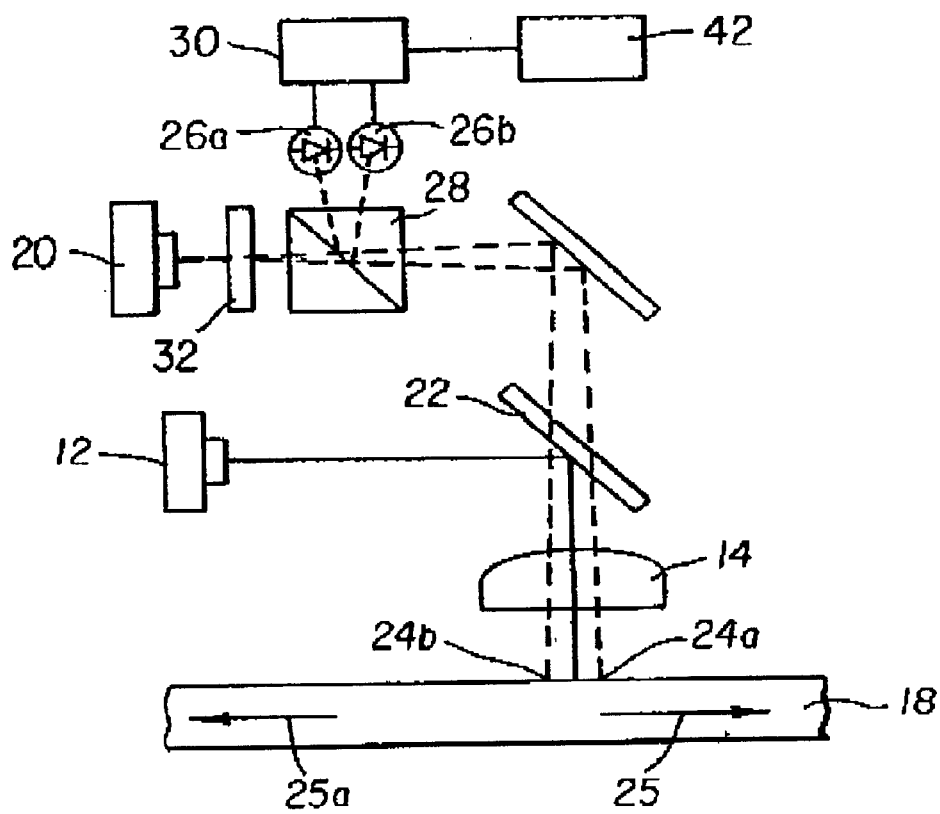
FIG. 3 is a schematic illustration of apparatus in accordance with a second embodiment of the present invention which uses DRAW and wherein the optical medium is moveable in forward and reverse directions.

FIG. 3 illustrates an optical head similar to the head in FIG. 2 with an alternative embodiment of the invention. In this head, the read laser device 20 includes only one laser source per channel. Beam splitter 32 disposed in the optical path of the readout beam divides the light from the read laser into at least two separate read beams that are focused to form read spots 24a and 24b.

Just as in FIG. 2, these continuously illuminated read spots are imaged onto at least two detector elements 26a and 26b and a multiplexer circuit 30 selects the signal for processing by the data channel 42 such that the recovered data always corresponds to a read spot that is located immediately downstream from the recording spot.

Figure 4:
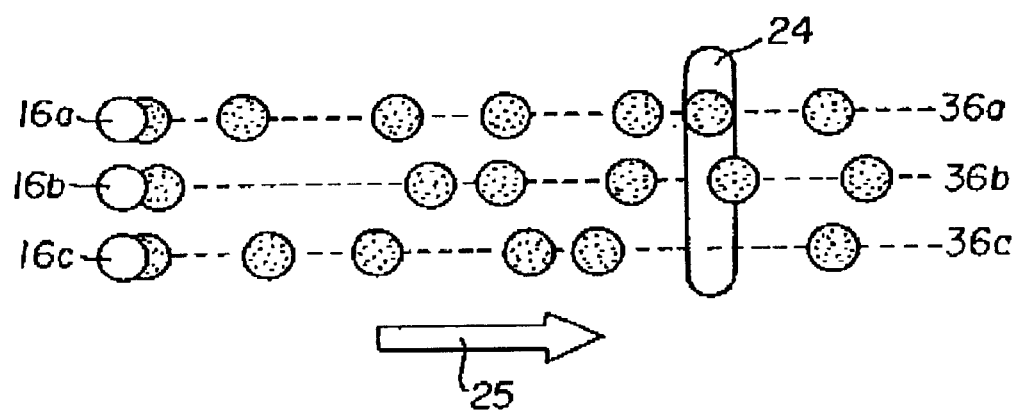
FIG. 4 shows a layout of multichannel record beams and the read beam showing the read beam to have a larger area than the record beam at the record medium surface.

DRAW functionality requires precise alignment control and stability in the optical head to keep the focused readout beam precisely centered on the newly recorded data track. The alignment requirements may be especially severe for multi-channel optical recording and for practice of this invention where more than one read spot must be simultaneously held in alignment. The required positional tolerance is much less than spacing between data tracks. FIG. 4 illustrates how the alignment requirement can be met using a read beam focused to a line rather than a spot. Recording laser beams are focused to form independent recording spots 16a, 16b, and 16c on the medium. While the recording medium moves in the direction 25, the modulation of the recording laser beams creates tracks 36a, 36b, and 36c of recorded marks downstream from the recording spots. These newly recorded tracks are illuminated by a read spot 24, focused to a line that crosses all the tracks at a location downstream from the recording spots.

Figure 5:
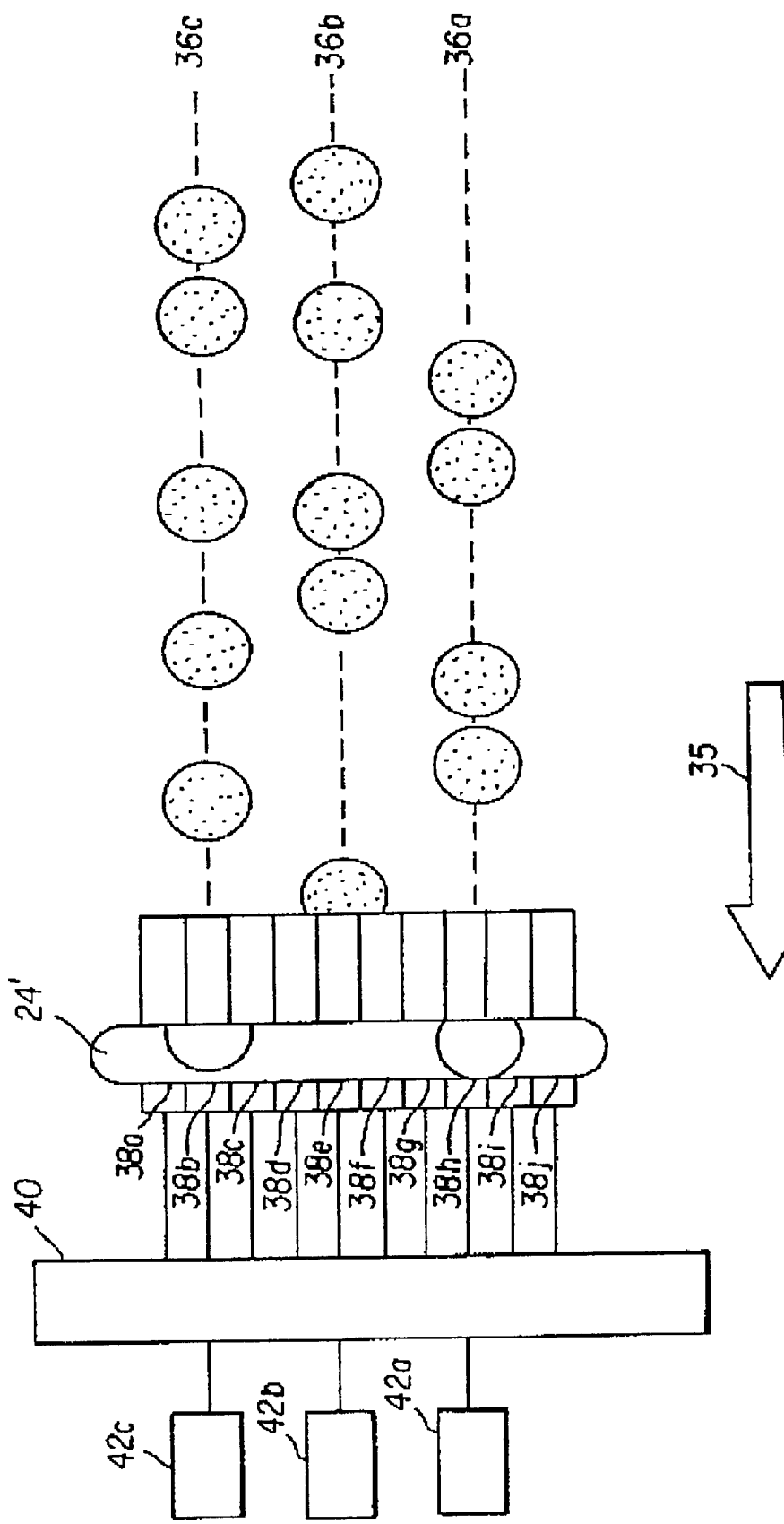
FIG. 5 corresponds somewhat to FIG. 4 but shows the multichannel read beam as it becomes incident upon a detector array.

FIG. 5 illustrates how the optical head images the line-shaped read spot onto a detector array to recover multichannel recorded data. The data tracks 36a, 36b, and 36c are imaged onto a detector surface containing an array of photodetector elements, 38a through 38j. The region of the recording medium that is illuminated by the read spot is imaged over the detector array at region 24'. Although an extended length of each track may be imaged onto the detector, only the recorded marks immediately illuminated by the record beam reflect light to affect the response of the photodetector elements. As the recording medium moves, its image moves across the detector in direction 35. However, the illuminated region of the detector remains fixed with the read beam. The detector elements generate signals corresponding to the scanned reflectance of the data tracks.

The spacing of detector array elements, 38a through 38j, should be no greater than half of the track pitch as imaged at the detector. In the FIG. 5 there are approximately three detectors elements per track. A multiplexer 40 selects the detector element that is best centered on the image of each track and routes its signal to the corresponding electronic data channels, 42a, 42b, and 42c. For example, detector element 38b is multiplexed to data channel 42c to read the data on track 36c, detector 38e is multiplexed to data channel 42b to read the data on track 36b, and detector 38h is multiplexed to data channel 42a to read the data on track 36a.

The readout system illustrated by FIG. 4 and FIG. 5 does not depend on precise alignment of the data tracks or readout beam. All that is required is that the focused readout line crosses all data tracks, the image of the focused readout line is narrower than the detector array, and the image of all data tracks targeted for readout cross the detector array. In this way, DRAW functionality can be accomplished without sub-micron alignment precision in the optical head, even for multichannel systems.

The invention has been described in detail with particular reference to certain preferred embodiments thereof, but it will be understood that variations and modifications can be effected within the spirit and scope of the invention.

PARTS LIST 10 optical head
12 record laser
14 objective lens
16 recording spot
16a recording spot
16b recording spot
16c recording spot
18 optical recording medium
20 read laser
22 beam splitter
24 read spot
24a read spot
24b read spot
25 media scan direction
25a media scan direction
26 detector
26a detector
26b detector
28 beam splitter
30 multiplexer circuit
32 beam splitter
35 image scan direction
36a track image
36b track image PARTS LIST (con't)

36c track image
38a photodetector element
38b photodetector element
38c photodetector element 38d photodetector element
38e photodetector element
38f photodetector element
38g photodetector element
38h photodetector element
38i photodetector element
38j photodetector element
40 multiplexer
42 data channel
42a data channel
42b data channel
42c data channel

What is claimed is:

1. Apparatus for simultaneously recording and reading information on a medium moveable in forward and reverse directions, comprising:

a) means including a first record laser and establishing a first beam path for recording information on the moveable medium;

b) means including at least a second read laser and at least a first and second read-out detector respectively associated with the forward and reversed directions of the recording medium, beam splitter means and an objective lens, said means establishing two beam paths which direct the laser light to positions forward and rearward from where the first laser beam illuminates the medium and such read laser beams are focused through the objective lens and reflected through the beam splitter means to the first and second detectors, respectively; and c) means for selecting either the first or the second read-out detectors and for processing information read by such selected detector so that as the medium is moving in the forward direction, the data are read from the first detector and when the medium is moving in the second direction, the data are read from the second detector.

2. The apparatus of claim 1 wherein the read laser device includes two or more laser sources where at least one of the sources illuminates the first read-out beam path and the second source illuminates the second read-out beam path.

3. The apparatus of claim 1 including a beam splitter which splits the light from the second read laser into two separate read beams.

4. The apparatus of claim 1 wherein the moveable medium is an optical tape.

* * * * *